United States Patent
Wild

(10) Patent No.: US 6,885,186 B2
(45) Date of Patent: Apr. 26, 2005

(54) RESONANT CIRCUIT FOR INCREASING VARIABLE RELUCTANCE SENSOR OUTPUT

(75) Inventor: Arthur Wild, Chillicothe, IL (US)

(73) Assignee: Caterpillar Inc, Peoria, IL (US)

( * ) Notice: Subject to any disclaimer, the term of this patent is extended or adjusted under 35 U.S.C. 154(b) by 442 days.

(21) Appl. No.: 10/097,155

(22) Filed: Mar. 13, 2002

(65) Prior Publication Data

US 2003/0176932 A1 Sep. 18, 2003

(51) Int. Cl.$^7$ .............................. G01P 3/46; G01B 7/30
(52) U.S. Cl. .................................. 324/163; 324/207.25
(58) Field of Search ................................. 324/163–172, 324/207.11, 207.13, 207.15–207.19, 207.2, 207.21, 207.22, 207.25

(56) References Cited

U.S. PATENT DOCUMENTS

| | | |
|---|---|---|
| 4,359,717 A | 11/1982 | Huber et al. |
| 5,352,938 A | 10/1994 | Wise et al. |
| 5,726,888 A | 3/1998 | Hornback |
| 6,522,131 B1 * | 2/2003 | Hiligsmann et al. ..... 324/207.2 |

* cited by examiner

*Primary Examiner*—Bot LeDynh
(74) *Attorney, Agent, or Firm*—Kelsey L Milman; Kevin C Earle

(57) ABSTRACT

An apparatus and method for measuring a characteristic of a machine. A variable reluctance sensor (VRS) is coupled to the machine. A first switching device and capacitor, coupled in parallel with the VRS, boosts a variable amplitude of a basic output signal generated by the VRS to increase the signal-to-noise ratio. A control input of the first switching device receives signals, and a modified output signal is generated by the first switching device, having a variable amplitude that is substantially higher than the variable amplitude of the VRS. The modified output signal has an increased signal-to-noise ratio such that machine speed can be more accurately measured during a start-up phase.

17 Claims, 1 Drawing Sheet

RESONANT CIRCUIT FOR INCREASING VARIABLE RELUCTANCE SENSOR OUTPUT

TECHNICAL FIELD

The present invention relates generally to a variable reluctance sensor (VRS) for use in a fuel combustion engine, and more particularly to a VRS that operates at low engine speed to more accurately detect gear tooth position and measure engine speed.

BACKGROUND

In the related art, a variable reluctance sensor (VRS) is described in U.S. Pat. No. 5,726,888, which discloses a method and system for testing a wheel speed sensor input circuit in an anti-braking system (ABS) and/or traction control (TC) system. Alternatively, a VRS, such as the VRS manufactured by Electro Corp., may be used to measure engine speed.

The conventional VRS is a coil of wire wrapped around a permanent magnet, with leads for connection into a circuit. Typically, the VRS is in the form of a head that is positioned adjacent a rotatable gear or the like. Thus, when the ferrous metal of a tooth of a gear moves past the sensor head, the magnetic field is altered, and a voltage is induced in the coil. The amplitude of the induced voltage can vary based on factors such as, for example, the gap between the VRS and the gear tooth and the speed at which the gear tooth passes the VRS.

As the metal of the gear tooth approaches the VRS, the voltage increases. When the center of the gear tooth passes across the VRS, however, the voltage equals zero; the voltage then reverses as the gear tooth moves away from the sensor. Accordingly, the voltage output of the VRS appears as a sinusoidal wave, and points at which the wave crosses zero volts from a peak voltage represent the points at which the center of the gear tooth passes the VRS. A comparator is used to determine whether a logic condition of 0 exists (conventionally, when the VRS output voltage is 0V) or 1 exists (conventionally, when there is a VRS output voltage greater than zero, e.g., 0.5V during a start-up phase of engine operation). Typically, the portion of the sinusoidal wave that is less than zero is not used by the VRS.

However, the related art VRS has various problems and disadvantages. For example, but not by way of limitation, during low-voltage operation periods such as engine startup, VRS output voltage is relatively low (e.g., about 0.5V, as noted above) due to the slow speed at which the gear tooth passes the VRS. The zero-crossing voltage in such a case is approximately 0.1V. Typically, there is substantial high-frequency electrical noise produced by other engine components (e.g., firing injectors or local power supplies on-board the engine). Thus, at low speeds there is a low signal-to-noise ratio, and the voltages induced by the noise sources will interfere with the operation of the VRS. As a result, engine speed cannot be monitored in an accurate manner during the startup period and during other low operating speed periods. However, once typical engine speed is reached, the VRS output voltage increases to much higher levels, e.g., about 22 volts; thus, the signal-to-noise ratio increases sufficiently such that engine characteristics (e.g., engine speed) can be accurately measured.

The present invention is directed to overcoming one or more of the problems as set forth above.

SUMMARY OF THE INVENTION

In an embodiment of the present invention, there is provided an apparatus that measures a characteristic of a machine, that includes a variable reluctance sensor (VRS) coupled to the machine and operative to generate a basic output signal having a variable amplitude and a basic frequency representative of the machine characteristic. The apparatus also includes a first switching device that is electrically coupled to the VRS and is operative to generate a modified output signal. The first switching device further includes a control input adapted to receive signals at a resonant frequency.

Additionally, in accordance with an embodiment of the present invention, there is provided a method of measuring a characteristic of a machine having a variable reluctance sensor (VRS), including generating a first output from the VRS, the first output having a variable amplitude and a basic frequency representative of the machine characteristic. The method also includes the step of generating a second output having a variable amplitude that is substantially greater than the variable amplitude of the first output.

Further, in accordance with an embodiment of the present invention, there is provided machine system that includes a machine and a sensing system electrically coupled to the machine. The sensing system includes a variable reluctance sensor (VRS) adapted to detect a position of a gear tooth mounted on a camshaft wheel of the machine, and to generate a basic output signal having a variable amplitude and a basic frequency representative of the machine characteristic. The sensing system also includes a first switching device electrically coupled in parallel with the VRS, the first switching device being operative to generate a modified output signal and having a control input adapted to receive signals at a resonant frequency. Further, the sensing system includes a charge storage device coupled in parallel with the first switching device and adapted to measure a voltage if the first switching device is in an OFF position, the charge storage element boosting a variable amplitude of the modified output signal to a level greater than the variable amplitude of the basic output signal.

BRIEF DESCRIPTION OF THE DRAWINGS

For a better understanding of the present invention, reference may be made to the accompanying drawings in which.

DETAILED DESCRIPTION

An exemplary embodiment of the present invention provides an apparatus and method of more accurately sensing machine characteristics during a start-up phase of a machine and during normal operation of the machine. The following description uses a vehicle engine as an example only. As would be understood by one skilled in the art, this invention also is applicable to other types of machines having a rotating member.

Figure 1:
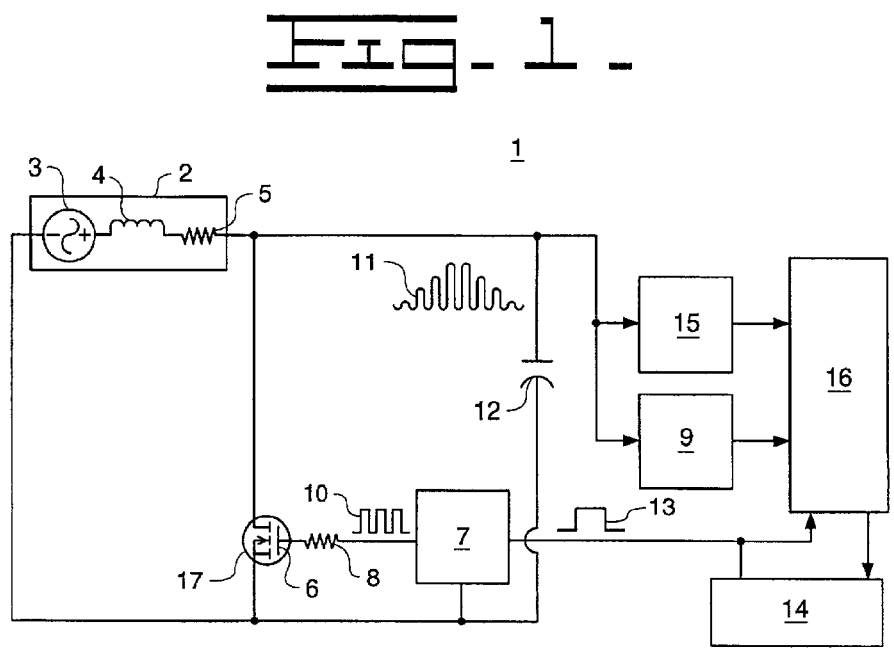
FIG. 1 is a schematic diagram of an exemplary embodiment of the present invention.

FIG. 1 illustrates a schematic diagram of an apparatus as represented by a circuit 1 that measures a characteristic of a machine. The circuit 1 may be coupled to the machine, or it may be incorporated into the machine. The circuit 1 includes a variable reluctance sensor (VRS) 2. The VRS 2 generates a basic output signal having a variable amplitude and a basic frequency being representative of the characteristic of the machine. While the VRS 2 is preferably implemented as a single fine-wire coiled about a magnetic structure (e.g., permanent magnet), the circuit 1 illustrates the VRS 2 as a reactance circuit that can generate a voltage 3 and includes an inductor 4 electrically coupled in series to a resistor 5, solely as a representation of the electrical properties of the VRS 2.

A first switching device 17, electrically coupled in series to the VRS 2, is operable to switch between a first, or OFF, position and a second, or ON, position and is operative to generate a modified output signal, as discussed in greater detail below. A control input 6 of the first switching device 17 is adapted to receive signals at a resonant frequency that is substantially higher (e.g., about 100 times higher) than the basic frequency of the VRS 2. The resonant frequency can be described as a modulated frequency, as the first switching device 17 "chops" the frequency of the basic output signal.

Preferably, a charge storage device 12 is coupled in parallel with the first switching device 17 and boosts a variable amplitude of the modified output signal of the switching device 17 to a level greater than the variable amplitude of the basic output signal of the VRS 2. A resonant circuit is formed by the inductance of the VRS 2 and the charge storage device 12. Due to the repetitive storage and release of energy from the VRS 2 as a result of the combined effect of the inductor 4 and resistor 5 (i.e. the reactance circuit), the charge storage device 12, and the pulsed operation of the first switching device 17, the amplitude of each peak of the resonant frequency waveform is substantially greater than, as well as proportional to, the variable amplitude of the basic output signal.

If the first switching device 17 is in the OFF position, the charge storage device 12 measures a voltage, illustrated in FIG. 1 as a simulated waveform 11 of the modified output signal. Advantageously, the charge storage device 12 is a capacitive element (e.g., a capacitor). The increase in the amplitude of the VRS 2 output voltage, due to the charge storage device 12 boosting the variable amplitude, will increase the signal-to-noise ratio such that the characteristic of the machine can be more accurately measured during a low-speed operation (e.g., start-up phase) of the machine. In an exemplary embodiment of the present invention, the charge storage device 12 has a low capacitance (e.g., 1000 picofarads), but is not limited by that exemplary capacitance value.

Further, a resettable timer 9 is electrically coupled to the first switching device 17. If the variable amplitude of the modified output signal exceeds a prescribed threshold level, the timer 9 receives the modified output signal from the VRS 2 and is reset within one cycle of the resonant frequency. Advantageously, the resettable timer 9 includes a comparator (not shown) having a predetermined threshold level, and the comparator receives the modified output signal to generate a comparator output. Since the threshold level will be exceeded each time the first switching device 17 is turned OFF, the comparator output will be a square wave having a period at the resonant frequency.

However, when the modified output signal is not generated above the prescribed threshold level due to the substantially lower amplitude of the VRS output voltage, the resettable timer 9 is not reset (i.e., the timer 9 is timed out because no resonant peak is detected above the prescribed threshold level).

A pulse generator 7 is electrically coupled to the control input, which is advantageously a gate, and generates pulses (e.g., a square wave 10) at the resonant frequency. Also advantageously, the first switching device 17 is an enhancement-type MOSFET having the control input 6 coupled to a low-resistance resistor 8. However, the present invention is not limited to a MOSFET and may include other available switching devices.

Preferably, the first switching device 17 generates an output as indicated by the simulated modified output signal waveform 11. As the VRS output voltage approaches zero, the resonant frequency peaks will also decrease proportionally, but will still be substantially greater than the variable amplitude of the basic output signal. In an exemplary embodiment of the present invention, the inductance in the VRS 2 is about 55 milliHenries and the resistance is about 155 ohms. Also, the pulse generator 7 has a pulse width (i.e., repetition rate) of 50 microseconds and a pulse period of 100 microseconds, and the pulse generator 7 generates a pulse of about 15V. However, the present invention is not limited to this exemplary embodiment, as would be understood by one skilled in the art.

The above-discussed embodiment of the present invention is designed to allow for more accurate measurement of a machine characteristic during the machine startup process and to continue to allow for measurement of the machine characteristic during normal machine operation. Thus, the machine characteristic may be measured when the VRS output voltage is low (e.g., about 0.5V), and when the VRS output voltage is high and exceeds a threshold voltage (e.g., about 20V) that corresponds to a threshold machine characteristic, e.g., speed.

Once that threshold level, e.g., normal operating speed, has been reached, a pulse inhibiting signal 13 generated by a second switching device 14 is used to disable the pulse generator 7 from pulsing the control input 6. The pulse inhibiting signal 13 may take the form of a flag generated by a software program of a software system, indicating that the machine is operating at normal speed, or of a signal from a hardware device. When the pulse generator 7 stops the generation of pulses, no signal is applied to the gate 6; therefore, the first switching device 17 acts as an open switch, and the basic VRS output signal is the signal to be read. At that point, measurement can be made at a measurement device 15 that is coupled to the charge storage device 12. The outputs of the resettable timer 9 and the measurement device 15 are multiplexed by a multiplexer 16 for use in the second switching device 14.

Figure 2:
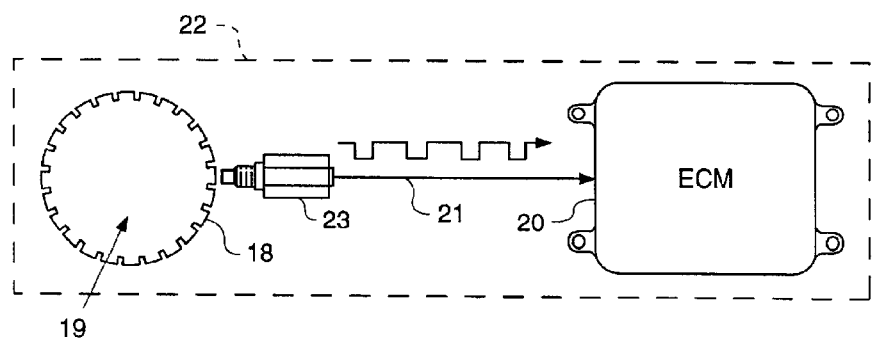
FIG. 2 is a diagram of an industrial application of a machine system that includes an exemplary embodiment of the present invention.

FIG. 2 illustrates an application of one embodiment of the present invention. An engine 22 comprises a measurement device 23 incorporating at least the VRS 2. The device 23 may further incorporate the remainder of circuit 1. The measurement device 23 is operative to measure the position of a gear tooth 18 located on a camshaft-mounted speed wheel 19. The output frequency of the measurement device 23 is indicative of the gear tooth 18 passing across the measurement device 23. The measurement device 23 generates a square wave pulsed output to an electronic control module (ECM) 20, which alternatively may include the remainder of the circuit 1 and is coupled to the measurement device 23 via a wire 21. In the engine 22 operation, the ECM 20 also performs various normal machine functions, including (but not limited to): interpreting the speed wheel pulses, determining the timing and duration, firing an injector solenoid, and controlling rail pressure. The measurement device 23 determines the location of the gear tooth 18 on the speed wheel 19 that is mounted on the camshaft of the engine 22. As a result, the ECM 20 can measure the speed of the camshaft. Accordingly, the present invention includes, but is not limited to, a machine, such as an internal combustion engine that uses a fuel of the gasoline or diesel type, having a start-up phase during which machine speed is low. The measurement device 23 measures the speed of the engine 22 throughout its operation, and the preferred embodiment of the present invention measures engine speed during the start-up phase. The system illustrated in FIG. 2 is preferably an engine of a vehicle.

Industrial Applicability

An embodiment of the present invention allows a machine characteristic, preferably engine speed, to be measured under various conditions, such as during initial start-up and during normal operation. Preferably, as seen in FIG. 2, the measurement device 23 incorporating at least the VRS 2 is placed in proximity to a speed wheel 19 mounted on the camshaft of an engine 22, such that the VRS 2 may measure when a gear tooth 18 on the speed wheel 19 passes by as the camshaft rotates.

It should be understood that while a preferred embodiment is described in connections with a vehicular engine, the present invention is readily adaptable to provide similar functions for other machines. Other aspects, objects and advantages of the present invention can be obtained from a study of the drawings, the disclosure and the appended claims.

While aspects of the present invention have been particularly shown and described with reference to the preferred embodiment above, it will be understood by those skilled in the art that various additional embodiments may be contemplated without departing from the spirit and scope of the present invention. However, a device or method incorporating such an embodiment should be understood to fall within the scope of the present invention as determined based upon the claims below and any equivalents thereof.

What is claimed is:

1. An apparatus that measures a characteristic of a machine, comprising:
    a variable reluctance sensor (VRS) coupled to said machine and operative to generate a basic output signal having a variable amplitude and a basic frequency representative of said characteristic; and
    a first switching device electrically coupled to said VRS, operative to generate a modified output signal, and having a control input for receiving signals at a resonant frequency.

2. The apparatus, as set forth in claim 1, further including:
    a charge storage device, electrically coupled in parallel with said first switching device, said charge storage device operative to boost an amplitude of said modified output signal to a level greater than said variable amplitude of said basic output signal.

3. The apparatus, as set forth in claim 2, wherein said charge storage device is a capacitive element adapted to measure a voltage if said first switching device is in a first position.

4. The apparatus, as set forth in claim 2, further including:
    a resettable timer electrically coupled to said first switching device,
    wherein said resettable timer is reset when said amplitude of said modified output signal exceeds a prescribed level, and
    wherein said resettable timer is not reset when said amplitude of said modified signal output does not exceed said prescribed level.

5. The apparatus, as set forth in claim 1,
    wherein said machine is an engine having a camshaft-mounted speed wheel,
    wherein said characteristic relates to engine speed, and
    wherein said VRS is operative to measure a position of a gear tooth on said camshaft-mounted speed wheel during a low-speed operation phase of said engine.

6. The apparatus, as set forth in claim 1, wherein said control input is a gate, and said apparatus further includes a pulse generator electrically coupled to said gate, said generator generating pulses at said resonant frequency.

7. The apparatus, as set forth in claim 1, further including:
    a second switching device operative to disable said first switching device when said machine operates at a characteristic above a prescribed threshold level and to generate a pulse inhibiting signal capable of inhibiting a pulsing of said control input; and
    a measurement device adapted to read said basic output signal when said second switching device inhibits said pulsing of said control input.

8. The apparatus, as set forth in claim 7, wherein said second switching device generates a flag indicative of normal machine operation based on an output of at least one of a hardware device and a software system.

9. A method of measuring a characteristic of a machine having a variable reluctance sensor (VRS), comprising:
    generating a first output from said VRS having a variable amplitude and a basic frequency representative of said characteristic; and
    generating a second output having a variable amplitude that is greater than said variable amplitude of said first output as the result of a charge stored in a charge storage device.

10. The method, as set forth in claim 9, further including:
    boosting said variable amplitude of said second output to a level greater than said variable amplitude of said first output with the charge stored in the charge storage device; and
    measuring a voltage across said charge storage device disposed across a first switching device when said first switching device is transited to a first position.

11. The method, as set forth in claim 10, wherein said charge storage device is a capacitive element.

12. The method, as set forth in claim 10, further including:
    resetting a timer when said variable amplitude of said second output exceeds a prescribed level; and
    timing out said timer when said variable amplitude of said second output signal does not exceed said prescribed level.

13. The method, as set forth in claim 9, wherein said second output is a periodic representation of said first output.

14. The method, as set forth in claim 9, further including disabling a first switching device when a characteristic of said machine exceeds a prescribed threshold level.

15. A machine system, comprising:
    a machine having a camshaft with a speed wheel mounted thereon, said speed wheel including at least one gear tooth; and
    a sensing system electrically coupled to said machine, said sensing system comprising,
        a variable reluctance sensor (VRS) adapted to detect a position of said gear tooth and to generate a basic output signal having a variable amplitude and a basic frequency representative of said position, a first switching device electrically coupled in parallel with said VRS, said first switching device generating a modified output signal and having a control input adapted to receive signals at a resonant frequency, and
a charge storage device coupled in parallel with said first switching device and adapted to measure a voltage if said first switching device is in a first position, said charge storage device operative to boost a variable amplitude of said modified output signal to a level greater than said variable amplitude of said basic output signal.

16. The system, as set forth in claim 15, wherein said machine is an engine, and further including a second switching device that disables said first switching device above a prescribed threshold level of a speed of said machine.

17. The system, as set forth in claim 15, further including an electronic control module (ECM) housing said first switching device and said capacitive element and electrically coupled between said sensing system and said machine, wherein said ECM interprets an output of said sensing system.

* * * * *